No. 700,917. Patented May 27, 1902.
J. H. HARTMAN.
BED BRACE.
(Application filed Dec. 11, 1901.)
(No Model.)
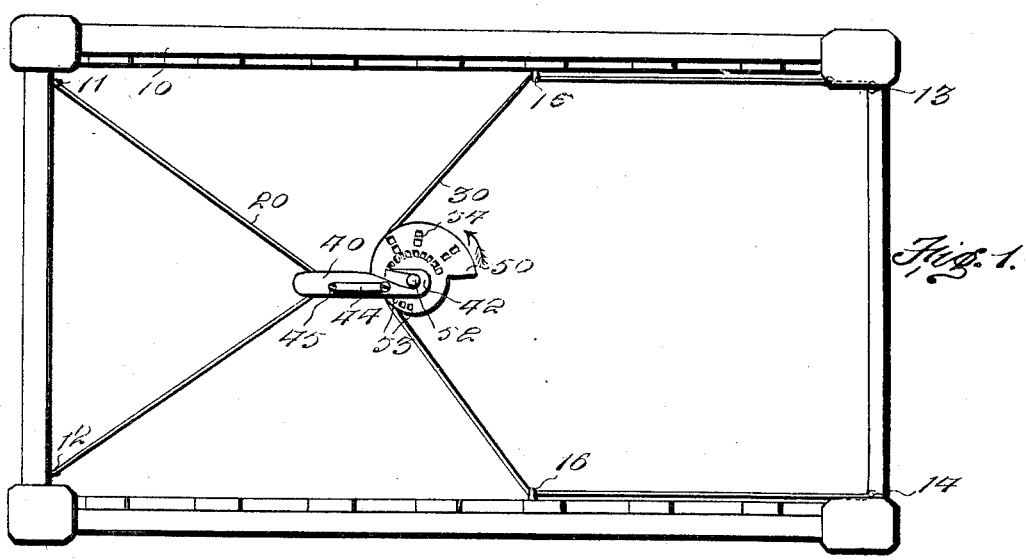
Fig. 1.
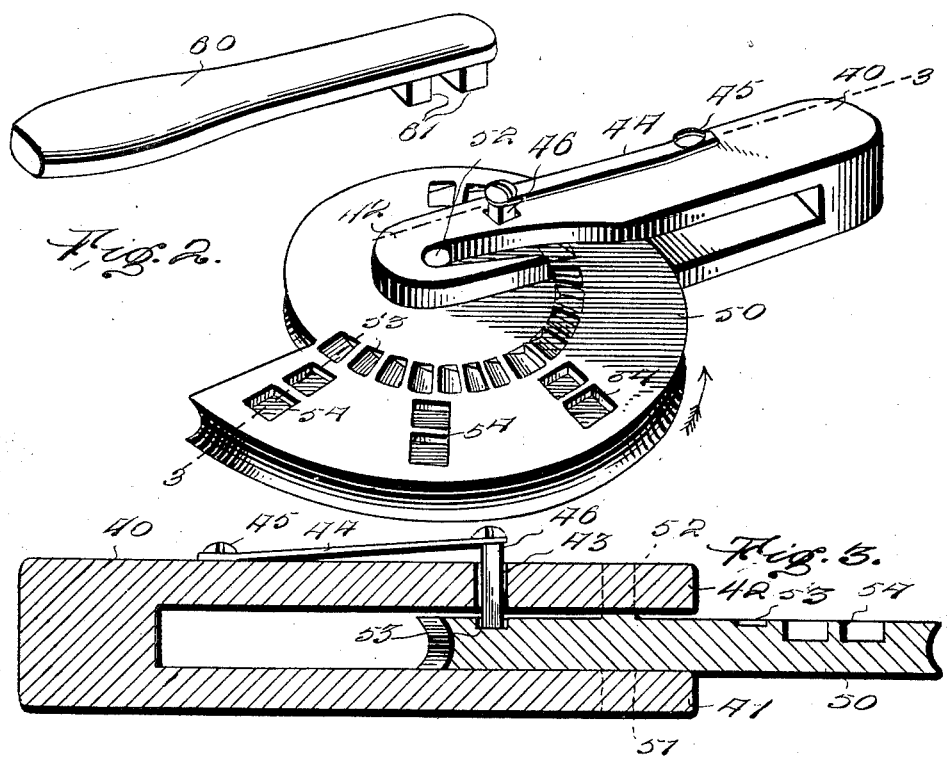
Fig. 2.
Fig. 3.
Witnesses
O. M. Simpson
S. M. McColl
J. H. Hartman, Inventor
by C. A. Snow & Co.
Attorneys

UNITED STATES PATENT OFFICE.

JOHN H. HARTMAN, OF ADVANCE, NORTH CAROLINA.

BED-BRACE.

SPECIFICATION forming part of Letters Patent No. 700,917, dated May 27, 1902.

Application filed December 11, 1901. Serial No. 85,510. (No model.)

*To all whom it may concern:*

Be it known that I, JOHN H. HARTMAN, a citizen of the United States, residing at Advance, in the county of Davie and State of North Carolina, have invented a new and useful Bed-Brace, of which the following is a specification.

This invention relates to braces for tightening bedsteads.

The object of the invention is to provide a brace which is simple, efficient, strong, and easily operated by an unskilled person.

Figure 1 of the accompanying drawings represents a plan view of a bedstead, showing this improved brace applied thereto. Fig. 2 represents a perspective view of the brace, showing also the wrench for manipulating it. Fig. 3 represents a longitudinal vertical section of the brace on the line 3 3 of Fig. 2.

The same reference-numerals indicate corresponding parts in all the figures.

In the bedstead 10 shown in the accompanying drawings the opposite ends of the head and foot boards are provided with eyes 11, 12, 13, and 14, and similar eyes 15 and 16 are secured to the side pieces. Two heavy wires 20 and 30 are attached at their opposite ends to the eyes on the bedstead, and these wires are drawn taut by a wire-tightening device hereinafter described. The brace-wire 20 is fastened at one end to the eye 11, then passed through an opening in one of the brace members, and is fastened at its other end to the eye 12. The ends of the wire 30 are passed through the eyes 15 and 16, respectively, and attached to the eyes 13 and 14.

The wire-tightening device, which shall be herein designated as the "brace," comprises two members 40 and 50. The member 40 is preferably in the form of a bifurcated hook, the hook ends 41 and 42 thereof being disposed parallel and having their engaging points on the same plane. The hook end 42 is provided, preferably at a point opposite its hooked extremity, with an aperture 43, which extends transversely therethrough and is preferably made square and is adapted to receive a spring-actuated dog now to be described. A flat or plate spring 44 is preferably riveted or bolted to the hook-body at one end at 45 and is attached at its other end to a dog 46, which projects through the aperture 43 in the hook 42 and is adapted to engage the other member 50. The member 50 comprises a cam having studs 51 and 52 disposed on its opposite sides on an axial line. These studs 51 and 52 are adapted to engage the hooked ends 41 and 42 of the member 40, which serve as bearings for the studs, and the cam is adapted to be rotated in the bearings so formed. This cam is provided, preferably on its upper face, with a circular series of ratchet-teeth or sockets, as 53, for engagement with the dog 46 of the member 40. This cam is also provided with a series of square indentations or sockets disposed in pairs, as 54, around the outer edge thereof for engagement by a wrench hereinafter described.

The cam member 50 is provided on its outer edge with a circumferential groove 55 for receiving the wire 30.

A wrench 60, provided on its lower face with two longitudinally-alined square lugs or teeth 61 for engaging the pairs of sockets 54 of the cam 50, serves to turn the cam to tighten the brace-wires.

In the operation of this bed-brace one end of the wire 20 is attached to the eye 11, and the other end is threaded through the slot 40' in the member 40 and attached to the eye 12. The member 40 is so disposed that the hooked end 42, carrying the dog 46, is on top. The wire 30 is attached at one end to the eye 13, and the other end of said wire is threaded through the eye 15, then passed across the bedstead, threaded through the eye 16, and then secured to the eye 14. The cam member 50 is then placed with its socketed face upward and with its grooved edge engaging the wire 30 between the eyes 15 and 16. The cam is then inserted in the slotted opening 40' between the hooked ends 41 and 42 of the member 40, and the studs 51 and 52 are drawn down into these hooked ends and the spring-dog 46 sprung into engagement with the ratchet-teeth, as 53. To tighten the wires and brace the bedstead, the cam is turned in its bearings, as shown by the arrow, and its gradually-widened eccentric portion bearing on the wire 30 draws both it and the wire 20 taut and holds them so. This turning of the cam is accomplished by inserting the lugs 61 of the wrench 60 into the sockets, as 54, of the cam-face and the cam forced around.

I claim as my invention—

1. In a brace of the class described, the combination of a relatively fixed member having means to engage a brace-wire, a revoluble cam member detachably mounted on the fixed member, said cam member having peripheral brace-wire-engaging means, and means to lock the revoluble cam member against reverse rotation, substantially as described.

2. In a brace of the class described, the combination of a relatively fixed member having means to engage a brace-wire, a revoluble cam member detachably mounted on the fixed member, said cam member having peripheral brace-wire-engaging means, means to lock the revoluble cam member against reverse rotation, and a lever to operate said cam member, the latter and the lever having mutually-engaging means to detachably secure the lever to the cam member, substantially as described.

3. A brace comprising a hook member having a slot extending through the greater portion thereof and provided with hooks at one end, a cam member adapted to extend into said slot between said hooks, one of said hooks being provided with means for engaging the upper face of said cam member.

4. A brace comprising a hook member having a slot extending through one end thereof, hooks disposed on said divided end, a spring-actuated dog extending through the shank of one of said hooks and projecting into said slot, a cam member journaled in said hooks and having ratchet-teeth adapted to be engaged by said dog.

5. A brace comprising a hook member having a slot extending through one end thereof, hooks disposed on said divided ends, a spring-actuated dog extending through one of said hooks and projecting into said slot, a cam member disposed in said slot and journaled in said hooks, ratchet-teeth disposed on said cam member and adapted to be engaged by said dog, sockets in said cam member, and means for engaging said sockets for rotating said cam member.

In testimony that I claim the foregoing as my own I have hereto affixed my signature in the presence of two witnesses.

JOHN H. HARTMAN.

Witnesses:
C. W. STEWART,
O. M. MARCH.